(12) United States Patent
Pipko et al.

(10) Patent No.: US 7,220,297 B2
(45) Date of Patent: May 22, 2007

(54) ANTI-CORROSIVE PIGMENTS AND METHOD FOR MAKING THE SAME

(75) Inventors: Gregory Pipko, Katzrin (IL); Asher Vinter, Jerusalem (IL)

(73) Assignee: Pigmentan Anticorrosive Pigments for Paints Ltd., Katzrin (IL)

( * ) Notice: Subject to any disclaimer, the term of this patent is extended or adjusted under 35 U.S.C. 154(b) by 0 days.

(21) Appl. No.: 10/479,616

(22) PCT Filed: Jun. 4, 2002

(86) PCT No.: PCT/IL02/00437

§ 371 (c)(1),
(2), (4) Date: Dec. 4, 2003

(87) PCT Pub. No.: WO02/099002

PCT Pub. Date: Dec. 12, 2002

(65) Prior Publication Data
US 2004/0168614 A1 Sep. 2, 2004

(30) Foreign Application Priority Data
Jun. 4, 2001 (IL) ...................................... 143551

(51) Int. Cl.
*C09C 1/02* (2006.01)
*C09C 1/22* (2006.01)

(52) U.S. Cl. .................. 106/14.39; 106/14.37; 106/14.34; 106/14.15; 106/462; 106/459; 106/287.29

(58) Field of Classification Search ................ 106/499, 106/464, 460–462, 456–457, 14.39, 14.37, 106/14.34, 14.15; 428/469, 457, 412
See application file for complete search history.

(56) References Cited

U.S. PATENT DOCUMENTS

| | | | |
|---|---|---|---|
| 3,960,611 A | 6/1976 | Walker et al. | |
| 4,337,092 A * | 6/1982 | Hestermann et al. | 106/14.05 |
| 4,411,876 A | 10/1983 | Sherif | |
| 4,501,615 A | 2/1985 | Reeder et al. | |
| 4,828,617 A | 5/1989 | Csillag et al. | |
| 4,999,250 A * | 3/1991 | Richardson et al. | 428/457 |
| 5,064,468 A * | 11/1991 | Okai et al. | 106/14.12 |
| 5,151,455 A * | 9/1992 | Miyata et al. | 523/200 |
| 5,665,149 A * | 9/1997 | Gotzmann et al. | 106/14.12 |
| 5,681,378 A | 10/1997 | Kerherve | |
| 6,312,812 B1 | 11/2001 | Hauser et al. | |
| 6,331,202 B1 * | 12/2001 | Pipko | 106/14.37 |

FOREIGN PATENT DOCUMENTS

| | | |
|---|---|---|
| JP | 09-302290 | * 11/1997 |
| WO | WO 98/40440 | 9/1998 |
| WO | WO 99/437757 | 9/1999 |

* cited by examiner

*Primary Examiner*—C. Melissa Koslow
(74) *Attorney, Agent, or Firm*—Pearl Cohen Zedek Latzer, LLP

(57) ABSTRACT

The invention relates to a paint and/or a coating composition including anti-corrosive pigment comprises a metal salt comprising a metal cation and an anion and a metal oxide or a metal hydroxide where the molar ratio of the total metal to the anion is in the range of 1:4 to 1:120.

50 Claims, 2 Drawing Sheets

ANTI-CORROSIVE PIGMENTS AND METHOD FOR MAKING THE SAME

FIELD OF THE INVENTION

The present invention relates to compositions of anti-corrosive pigments and to a method for making the same. More specifically, the present invention relates to heavy metal free anti-corrosive pigments and to a method for making the same.

BACKGROUND OF THE INVENTION

Anti-corrosive pigments are used to protect metal surfaces against oxidation and corrosion. Those pigments usually include heavy metals salts, which hinder the rusting of the metal surface by either cathodic or anodic inhibition mechanisms. Upon dissolving in the aqueous phase, commercial available anti-corrosive pigments partially dissolved to provide hydrated metal cation and hydrated anion solutions, which reacts with the metallic surface. The reaction between the partially solubilized pigments provides the desired inhibition of corrosion.

Zinc compounds such as zinc phosphate and zinc chromate are currently widely used as anti-corrosive pigments. Zinc is a heavy metal element and is considered to be toxic at certain concentrations.

Magnesium phosphate salts, and especially tri-basic magnesium phosphate were presented as possible anti-corrosive pigments. U.S. Pat. No. 3,960,611 to Walker discloses a composition for anti-corrosive pigments containing magnesium phosphate. This composition was found to provide only a moderate corrosion inhibition.

The anti-corrosivity of magnesium phosphates was significantly improved by applying molten magnesium salt on the surface of ferric materials.

U.S. Pat. No. 4,411,876 to Sherif, discloses an anti corrosive pigment comprising tri-magnesium phosphate salts. The production of tri-magnesium phosphate salts includes admixing of mono-magnesium phosphate solution with a slurry of magnesium hydroxide in pH below 6.8.

However, it is acknowledged that maintaining of pH higher 9.0 is profitable for corrosion inhibition. A composition that provides for a buffering effect in a basic range is thus preferred.

U.S. Pat. No. 6,331,202 to Applicant discloses anti-corrosive amino-based compositions, including both oxyaminophophate and one selected from oxynitrite, oxymetalphosphate, oxyborate or oxysilicate.

Similarly, U.S. Pat. No. 6,312,812 to Hauser et al. discloses anti-corrosive compositions including both transition elements such as metals, and amine-containing materials.

The object of the invention is to provide a non-toxic anti-corrosive pigment that does not contain heavy metals and perform equally or better then commercial available anti-corrosive pigments.

SUMMARY OF THE INVENTION

The invention relates to an anti-corrosive pigment comprising a metal salt comprising a metal cation and an anion and a metal having at least one oxygen atom where the molar ratio of the total metal to the anion in the range of 4:1–120:1.

The invention also relates to an anti-corrosive pigment where the metal is magnesium, calcium or iron, or any combination thereof.

The invention also relates to an anti-corrosive pigment where the metal have at least one oxygen atom is magnesium having at least one oxygen atom selected from magnesium oxide, magnesium hydroxide or any combination thereof.

The invention also relates to an anti-corrosive pigment where the metal have at least one oxygen atom comprising iron such as ferrous oxide, ferrous silicate, or any combination thereof.

The invention also relates to an anti-corrosive pigment where the metal having at least one oxygen atom comprising calcium such as calcium oxide, calcium hydroxide, calcium bicarbonate, calcium carbonate, or any combination thereof.

The invention also relates to an anti-corrosive pigment where the metal salt is a phosphate salt such as magnesium phosphate.

The invention also relates to an anti-corrosive pigment further comprising a pH buffering agent, for example, as amine-containing substance such as monoethyl amine, diethyl amine, triethyl amine, monoethanol amine, diethanol amine, triethanol amine, 1,2-diazide, 1,2,3-triazide, dicyclohexylamine, aliphatic amines, aromatic amines, melamine hexamethylentetiamine and pentaethylenetetramine, ammonium hydroxide, amino acid, and poly amines.

The invention also relates to an anti-corrosive pigment further comprising a pH buffering agent, for example, a base such as potassium hydroxide, sodium hydroxide, calcium hydroxide.

The invention also relates to an anti-corrosive pigment having final pH of about 7 to 11, and having solubility in equilibrated water which is greater than about 0.2%.

The invention also relates to an anti-corrosive pigment wherein the metal having at least one oxygen atom comprises magnesium compound in combination wit a calcium compound wherein the magnesium compound is for example, magnesium oxide, magnesium hydroxide or any combination thereof, and wherein the calcium compound is, for example, calcium oxide, calcium hydroxide or any combination thereof.

The invention also relates to an anti-corrosive pigment wherein the metal having at least one oxygen atom comprises magnesium compound in combination with a iron compound wherein the magnesium compound is magnesium oxide, magnesium hydroxide or any combination thereof, and wherein the iron compound is iron oxide, iron hydroxide or any combination thereof.

The invention also relates to an anti-corosive pigment further comprising a preservative in a range of 0.1 to 10% (w/w) of the pigment weight, such as, biocides, fungicides, algaecides, sporocides, insecticides, herbicides, citrimide, chlorohexadine and the like, and quaternary amines, such as Querton KKBCL-50 or Querton 246, Querton GCL-50, Querton 210CI50, or Querton GCL-50, boric acid, sodium borate, zinc oxide or copper oxide.

The invention also relates to an anti-corrosive pigment further comprising a surface-active agent in the range of 0.2 to 2% (w/w) of the pigment weight, such as, lignosulphonates or oleic acids.

The invention also relates to an anti-corrosive pigment further comprising a coloring agent in the range of 0.1 to 40% (w/w) of the pigment weight, such as, fuchsin, rohdamine, methylene blue, iron oxide, methyl violet, or alizarine.

The invention also relates to an anti-corrosive pigment further comprising a UV stabilizer, a UV absorber, and a UV enhancer.

The invention also relates to an anti-corrosive pigment wherein the pigment of in a waterborne material selected from paint, coating, plaster or filler wherein said pigment is in the range of 1.7 to 25% (w/w) of the waterborne material.

The invention also relates to an anti-corrosive pigment wherein the pigment of in a solvent base material selected from paint, coating, plaster or filler wherein the pigment is in the range of 1.7 to 25% (w/w) of the solvent base material.

The invention also relates to an anti-corrosive pigment wherein the pigment of in an emulsion wherein said pigment is in the range of 1.7 to 25% (w/w) of the emulsion.

The invention also relates to a method for the production of an anti-corrosive pigment, the pigment comprising a) a metal salt comprising a metal cation and an anion, and b) a metal having at least one oxygen atom; the method comprising the step of mixing an acid of the anion with the metal having at least one oxygen atom, thereby generating the metal salt; wherein the molar ratio of the total metal to the anion is in the range of 4:1 to 120:1.

The invention also relates to a method for the production of an anti-corrosive pigment, wherein the acid is phosphoric acid and the metal having at least one oxygen atom is magnesium oxide or magnesium hydroxide and wherein the acid is diluted by water to obtain a 5–15% (wt) solution and the metal having at least one oxygen atom is gradually added to a range of 7–35% (wt) of the pigment.

The invention also relates to a method for the production of an anti-corrosive pigment, wherein additional magnesium phosphate salt is gradually admix to the phosphoric acid and metal having at least one oxygen atom to yield a molar ratio of the total magnesium to the phosphate in the range of 4:1 to 120:1.

The invention also relates to a method for the production of an anti-corrosive pigment, comprising the step of admixing 5 to 15% (wt) phosphoric acid with 7 to 35% (wt) magnesium oxide or magnesium hydroxide so as to obtain pH of about 7 to 11 in the anti corrosive pigment.

The invention also relates to a method for the production of an anti-corrosive pigment, comprising the step of gradually admixing 7 to 35% (wt) magnesium oxide or magnesium hydroxide to 5–15% (wt) phosphoric acid solution so as to achieve solubility of the pigment magnesium-containing ingredients which is higher than 0.2%.

The invention also relates to a method for the production of an anti-corrosive pigment, comprising the step of gradually admixing 7 to 35% (wt) magnesium oxide or magnesium hydroxide to 5–15% (wt) phosphoric acid solution so as to achieve solubility of the pigment magnesium-containing ingredients which is approximately in the range 0.2%–0.8%.

The invention also relates to a method for the production of an anti-corrosive pigment, comprising the step of gradually admixing 5–15% (wt) phosphoric acid solution, 3–10% (wt) of at least one amine containing substance and 7 to 35% (wt) magnesium oxide or magnesium hydroxide in water.

The invention also relates to a method for the production of an anti-corrosive pigment, comprising the steps of admixing 3–10% (wt) of at least one amine containing substance or base in water; admixing phosphoric acid to the amine containing solution or base so as 5–15% (wt) of amino phosphoric acid solution is obtained.

BRIEF DESCRIPTION OF THE FIGURES

The present invention will be understood and appreciated more fully from the following detailed description taken in conjunction with the drawings in which.

DETAILED DESCRIPTION OF THE INVENTION

Figure 1A:
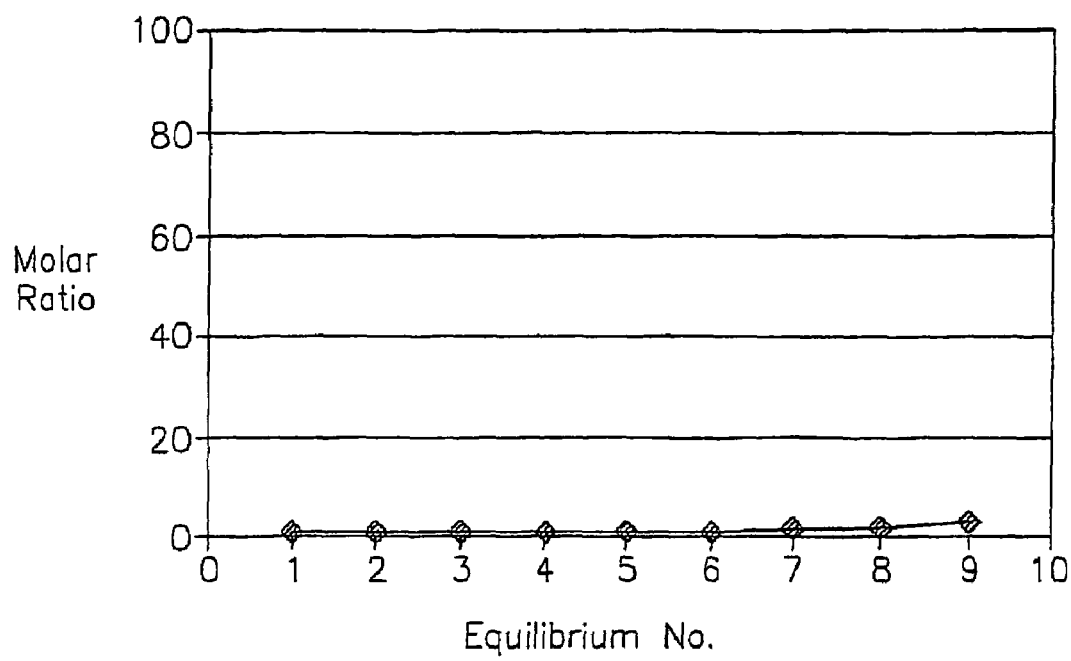
FIG. 1 presents the molar ratio of $Mg^{+2}$/phosphate as a function of the number of equilibrating steps of a trimagnesium diphosphate octahydrate product. The small graph presents a fine scale of the above graph.

In the following description, various aspects of the invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Embodiments of the invention relate to a heavy metal free anti-corrosive pigment and a method for producing such anti-corrosive pigment, for inhibiting corrosion of metallic surfaces. Corrosion is defined herein as a process that seeks to reduce the binding energy in metals and to all practical appearances of said process. Metallic or metal is defined herein as any substance able to be subjected to corrosion including, for example, magnesium and calcium. Molar ratio defined herein as the ratio between total metal to anion of the pigment. This ratio is measured by dissolving to equilibrium 10 grams of the dried pigment in 100 ml distilled water at 25° C. and than measuring the quantities of the total metal and anion in the water. Total metal means the total metal in the pigment, i.e., the metal in the salt and in the oxide. The pH of the pigment is measured by suspending 10 gram of pigment in 100 ml distilled water and measures the pH of the suspension.

In some embodiment of the invention an anti corrosive pigment is produced. The anti corrosive pigment includes a composition of metal having at least one oxygen atom such as metal oxide or metal hydroxide and metal salt where the composition is at least partially soluble in a liquid phase. The metal having at least one oxygen atom includes at least one metal cation and one oxygen or hydroxyl, respectively. The metal salt includes at least one metal cation and at least one anion. The molar ratio of the total metal to the anion is in the range of 4:1 to 120:1.

In one embodiment the molar ratio of the total metal to the anion is about 20:1 to 50:1. In another embodiment, the molar ratio of the total metal to the anion is about 50:1 to 80:1. In another embodiment, the molar ratio of the total metal to the anion is about 80:1 to 100:1.

In some embodiment the concentration of the metal cation is higher the concentration of the metal anions.

In some embodiment, the metal may be, for example, magnesium, calcium iron, etc. In another embodiment the metal may be a combination of at least two kinds of metal such as magnesium and calcium, magnesium and iron, iron and calcium, etc. In one embodiment the metal salt may be, for example, a phosphate salt such as magnesium phosphate salt.

In some embodiment the metal having at least one oxygen atom may be magnesium compound, for example, magnesia, magnesium hydroxide, magnesium oxide, etc. In another embodiment the metal having at least one oxygen atom may be, for example, calcium oxide, calcium hydroxide, calcium carbonate, calcium bicarbonate, etc. In another embodiment the metal have at least one oxygen atom, and may be an iron oxide compound, for example, ferrous oxide, ferrous silicate, etc.

In some embodiment the metal having at least one oxygen atom includes magnesium oxide or magnesium hydroxide compound in combination with an calcium oxide or calcium hydroxide compound.

In some embodiment the metal having at least one oxygen atom includes magnesium oxide or magnesium hydroxide compound in combination with an iron oxide or iron hydroxide compound.

In some embodiment the pigment may further include pH-buffering agents for increasing the pH of the obtained pigment to above pH 7. The pH buffering agent may be an amine-containing substance. The amine-containing substance may be, for example, monoethyl amine, diethyl amine, triethyl amine, monoethanol amine, diethanol amine, triethanol amine, 1,2-diazide, 1,2,3-triazide, dicyclohexylamine, aliphatic amines, aromatic amines, melamine, hexamethylentetramine and pentaethylenetetramine, ammonium hydroxide, amino acids, poly amines, etc. A base may substitute the amine-containing substance. The base may be, for example, potassium hydroxide, sodium hydroxide, calcium hydroxide, etc.

In some embodiment, the final pH of the anti-corrosive pigment is in the range of about 7 to 11. In some embodiment, the pH of the anti-corrosive pigment is approximately 7. In some embodiment, the pH of the anti-corrosive pigment is approximately 9.

In some embodiment, the solubility of the magnesium components of the pigment composition is greater than 0.2%, when measured in equilibrated water. In another embodiment, the solubility of the magnesium components of the pigment composition is between 0.2%–1.0%. In another embodiment, the solubility of the magnesium components of the pigment composition is between 0.2%–0.8%. In another embodiment, the solubility of the magnesium components of the pigment composition is between 0.2%–0.5%.

In some embodiment of the invention, the anti-corrosive pigment may include at least one preservative in a range of 0.1 to 10% (w/w) of the pigment weight. The preservative may be for example, biocides, fungicides, algaecides, sporocides, insecticides, herbicides etc.

According to another embodiment of the invention the anti corrosive pigment may include at least one preservative such as, for example, citrimide, chlorohexadine and the like, and quaternary amines, such as Querton KKBCL-50 or Querton 246 (namely benzalkonium chloride), Querton GCL-50, Querton 210CI50, or Querton GCL-50 (i.e., quaternary amine comprising aliphatic and/or amine residues), etc.

According to another embodiment of the invention the anti corrosive pigment may include at least one inorganic preservative such as, for example, boric acid, sodium borate or any other suitable borate, zinc oxide or copper oxide, etc.

According to some embodiment of the invention surface-active agents may be incorporated in either the anti-corrosive pigment or in the waterborne, emulsion or solvent-base material comprising the pigment. The active agent is in the range of 0.2 to 2.0%(w/w) of the weight of the pigment. The surface-active agents, optionally pretreated with nitrogen-containing materials, may be utilized for homogenization of the reaction mixture. The surface active agents may be, for example, lignosulphonates and the like, oleic acid and the like, etc.

According to one embodiment of the invention the anti-corrosive pigment may additionally include, or incorporated with, any suitable coloring agents such as, for example, fuchsin, rohdamine, methylene blue, iron oxide, methyl violet, alizarine, etc. The coloring agent is in the range of 0.1 to 40% (w/w) of the pigment weight. Additionally, the anti corrosive pigment may include, for example, UV stabilizer, UV adsorber, UV enhancer, etc.

It is appreciated that the composition according to the present invention may be incorporated, introduced or dispersed in any suitable waterborne, emulsion, or solvent-base material such as, for example, paint, coating, plaster or filler. According to an embodiment of the invention, the waterborne or solvent-base material may be, for example, acryl, alkyd, epoxy, polyester, polyurethane, or chlorinated rubber. The concentration of the anti corrosive pigment in the waterborne, emulsion, or solvent-base material may be in the range of 1.7 to 25% (w/w).

According to some embodiments of the present invention, a method for producing anti-corrosive pigment including a) a metal salt comprising a metal cation and an anion, and b) a metal oxide and/or a metal hydroxide is introduces. The method includes a step of mixing an acid of the anion with the metal having at least one oxygen atom, thereby generating a metal salt wherein the molar ratio of the total metal to the anion (metal:anion) is in the range of 4:1 to 120:1. This molar ratio which is not the stoichometric ratio, highly influence the anti corrosive properties of the produced anti-corrosive pigment as will be shown herein below.

In one embodiment a phosphoric acid is diluted by water so 5 to 15% (wt) solution of phosphoric acid is obtained. A mixing step is performed by gradually admixing 7 to 35% (wt) magnesium oxide or magnesium hydroxide to the phosphoric acid solution, so a dispersion of magnesium phosphate is obtained. The mixing step may be performed by any other mixing procedure suitable for obtaining a dispersion of magnesium phosphate. The obtained dispersion is than dried to yield the anti corrosive pigment. The anti corrosive pigment may have a molar ratio of the total magnesium to the phosphate in the range of 4:1 to 120:1. The anti corrosive pigment is than added to waterborne, emulsion, or solvent-base material and, for example, painted or coated on the surface of a metal such as, for example, iron, aluminum, etc.

In another embodiment of the invention additional magnesium phosphate salt is gradually admix to the dispersion of the phosphoric acid and magnesium hydroxide or magnesium oxide to yield a molar ratio of the total magnesium to the phosphate in the range of 4:1 to 120:1.

According to some embodiments of the invention a method for producing anti-corrosive pigment includes the step of admixing 5 to 15% (wt) phosphoric acid with 7 to 35% (wt) magnesium oxide or magnesium hydroxide. The admixing is performed so as to obtain pH of about 7 to 11 in the solution of the anti corrosive pigment. The anti corrosive pigment thus produced comprising magnesium phosphate with an excess of magnesium oxide or magnesium hydroxide. The obtained molar ratio of the magnesium to the phosphate in the pigment is in the range of 4:1 to 120:1.

In some embodiment a method for producing anti-corrosive pigment includes the step of gradually admixing 7 to 35% (wt) magnesium oxide or magnesium hydroxide to 5–15% (wt) phosphoric acid solution so as to achieve solubility of the pigment magnesium-containing ingredients which is higher than 0.2%.

In some embodiment a method for producing anti-corrosive pigment includes the step of gradually admixing 7 to 35% (wt) magnesium oxide or magnesium hydroxide to 5–15% (wt) phosphoric acid solution so as to achieve solubility of the pigment magnesium-containing ingredients which is approximately in the range 0.2%–0.8%.

In some embodiment a method for producing anti-corrosive pigment includes admixing 7 to 35% (wt) magnesium oxide or magnesium hydroxide to a 5–15% (wt) phosphoric acid solution, where part of the magnesium oxide or magnesium hydroxide is substituted by calcium containing substances.

In some embodiment a method for producing anti-corrosive pigment includes admixing 7 to 35% (wt) magnesium oxide or magnesium hydroxide to a 5–15% (wt) phosphoric acid solution, where part of the magnesium oxide or magnesium hydroxide is substituted by iron containing substances.

In some embodiment a method for producing anti-corrosive pigment includes gradually admixing 5–15 (wt) phosphoric acid solution, 3–10% (wt) of at least one amine containing substance and 7 to 35% (wt) magnesium oxide or magnesium hydroxide in water.

In some embodiment a method for producing anti-corrosive pigment includes gradually admixing 3–10% (wt) of at least one amine containing substance in water. Admixing phosphoric acid to the amine containing solution so as 5–15 (wt) of amino phosphoric acid solution is obtained. Gradually admixing 7 to 35% (wt) magnesium oxide or magnesium hydroxide to the amino phosphate solution so as a mixture including magnesium phosphate, magnesium oxide, and/or magnesium amino phosphate is obtained.

In some embodiment a method for producing anti-corrosive pigment includes gradually admixing 5–15% (wt) phosphoric acid solution, 3–10% (wt) of a base and 7 to 35% (wt) magnesium oxide or magnesium hydroxide in water.

In some embodiment a method for producing anti-corrosive pigment includes gradually admixing 5–15% (wt) phosphoric acid solution, 3–10% (wt) of a combination of at least one amine containing substance and a base and 7 to 35% (wt) magnesium oxide or magnesium hydroxide in water.

In some embodiment a method for producing anti-corrosive pigment further include admixing of preservatives in a range approximately between 0.1–10% (wt).

In some embodiment a method for producing anti-corrosive pigment further include admixing of surface active agent in a range approximately between 0.2–2% (wt).

In some embodiment a method for producing anti-corrosive pigment further include admixing of coloring agent in a range approximately between 0.1–40% (wt).

Figure 1B:
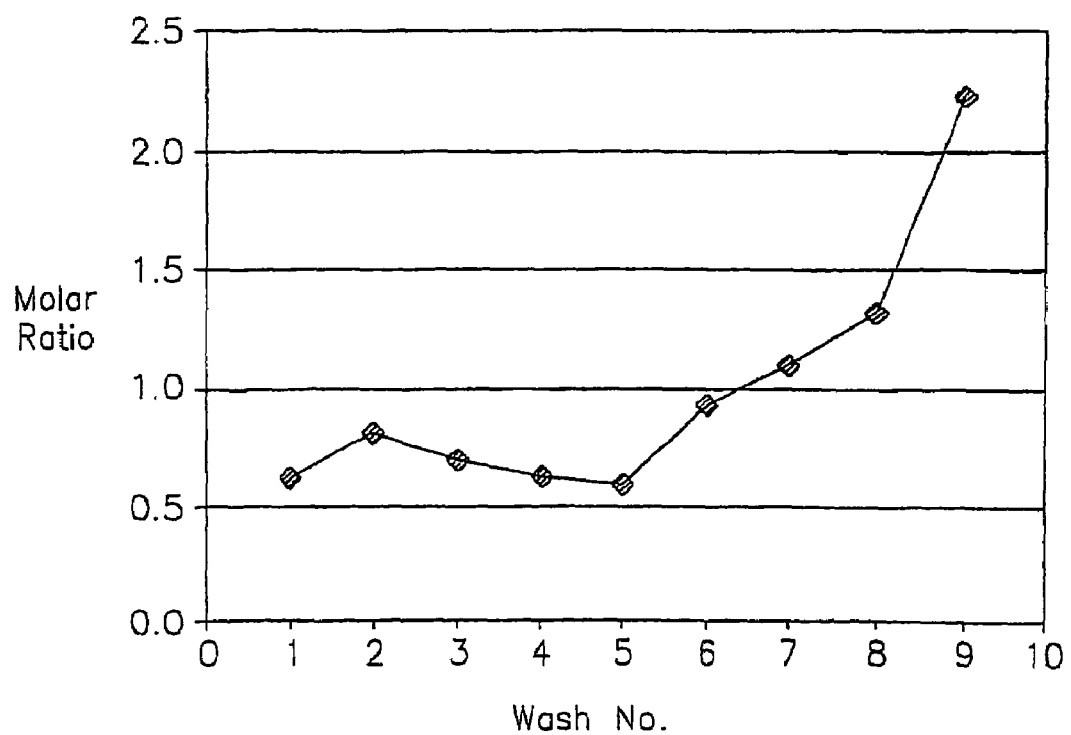

Reference is now made to FIG. 1, presents the molar ratio of $Mg^{+2}$/phosphate as a function of the number of equilibrating steps of a tri-magnesium diphosphate octahydrate, commercial available product (Fluka, Gemany), which was equilibrate 10 times with fresh aqueous phase. As shown in the small graph the magnesium to phosphate molar ratio in this product is about 3:2. This ratio is the stochiometrical ratio calculated for the product. This product was found to be an anti-corrosive pigment of low efficiency according to ASTM 53209 and ASTM 53210.

Figure 2:
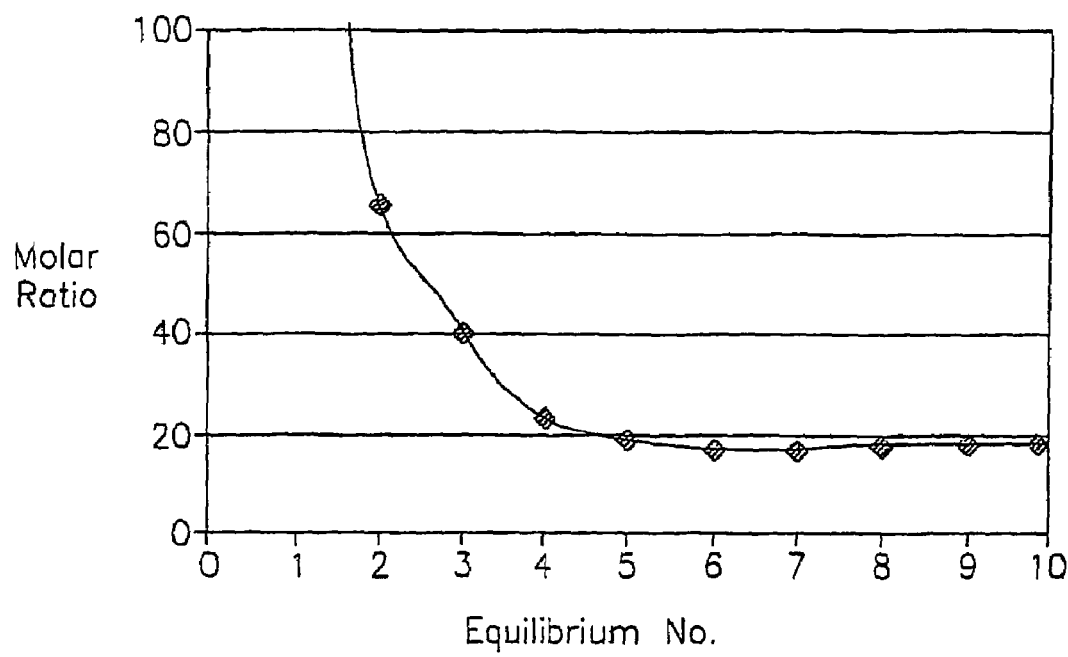
FIG. 2 presents the $Mg^{+2}$/phosphate molar ratio as a function of the number of equilibrating steps of magnesium phosphate salt in access of 50% magnesium oxide.

Reference is now made to FIG. 2, presents the molar ratio of $Mg^{+2}$/phosphate as a function of the number of equilibrating steps, of a pigment including magnesium phosphate salt in access of 50% magnesium oxide. The equilibration was conducted up to 10 times with fresh aqueous phase. The molar ratio of $Mg^{+2}$/phosphate in equilibrium after the first equilibrium step was above 100 and reduced after the 10th equilibrium step to approximately 18. A steady state was achieved after equilibrium step 5 meaning that The molar ratio of $Mg^{+2}$/phosphate at steady state is about 18:1 meaning that for 18 molecules of $Mg^{+2}$ there is 1 molecule of phosphate. This ratio is different from the stoichometric ratio obtained for the commercial available product described in FIG. 1. This pigment was found to be an excellent anti-corrosive pigment, according to ASTM 53209 and ASTM 53210, for aluminum and aluminum containing materials and other metals.

Figure 3:
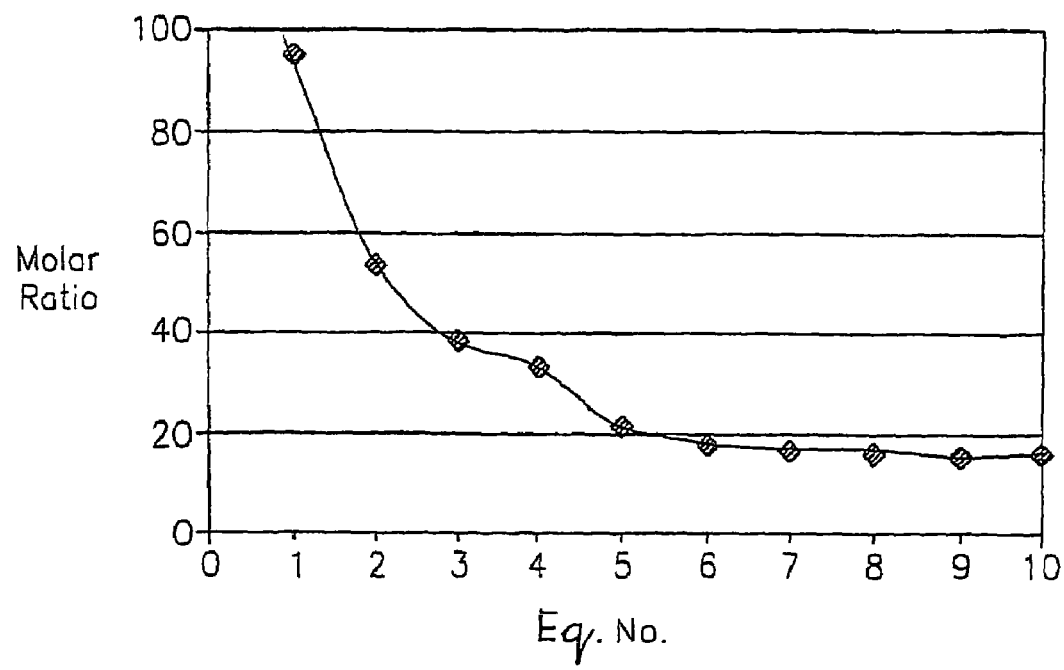
FIG. 3 presents the $Mg^{+2}$/phosphate molar ratio as a function of the number of equilibrating steps of magnesium phosphate salt in access of 50% magnesium oxide and with addition of a pH-buffering agent.

Reference is now made to FIG. 3, presents the $Mg^{+2}$/phosphate molar ratio as a function of the number of equilibrating steps, for a pigment including magnesium phosphate salt in access of 50% magnesium oxide and with addition of a pH-buffering agent. The buffering agent that was added is a water-immiscible aliphatic amine base which is capable to maintain the pH of the suspension at about pH=10. The equilibration was conducted up to 10 times with fresh aqueous phase. The magnesium to phosphate molar ratio at steady state was about 18:1. This pigment was found to be an excellent anti-corrosive pigment, according to ASTM 53209 and ASTM 53210, for iron, iron containing materials and other metallic products.

The following examples further illustrate and describe the invention disclosed herein. The invention is not to be limited in scope by the following examples.

In all the examples the test was conducted according to ASTM 53209 and ASTM 53210 and the results are presented according to the scale introduced in the above mentioned ASTM standards.

EXAMPLE 1

Phosphoric acid (0.48 Kg of total weight, Agriculture Grade, 85%) was diluted in 3.83 liter of water in ambient temperature and mixed for about 5 minutes. Magnesium oxide (0.69 Kg, KP Grade by Periclase ltd Israel), and oleic acid (4 gr) were gradually admixed to the water suspension in few intervals. The completion of the admixing step was provided wherein the pH of the equilibrated pigment product was 10.8. In is acknowledged that said admixing step was followed with noticeable temperature changes and thus wherein the temperature decreasing was recorded, and wherein the pH titration was performed as described above, the mechanical mixing was terminated, and the suspension was dried in an oven (2.5 hours, above 105° C.).

The anti-corrosive pigment hereto obtained was incorporated (7% by weight) in a solvent base paint comprising short-alkyd. The paint was applied (40 μm) on top of the two sides of iron-made standard Q-panel. One painted and dried side of each panels were subject of standard X scribe. Triplets of panels were kept in a salt immersion camera (NaCl, 5% wt) at ambient temperature. The immersion test results were obtained by experienced an aided eye after 500 hours, evaluating the general appearance, scribe, blisters size and degree of each triplet. The average test results of those coated iron to panels were good (according to ASTM standard). The results were better than the results obtained for other iron panels coated with similar paints comprising commercial available anti-corrosive pigments.

EXAMPLE 2

Phosphoric acid (0.48 Kg of total weight), Magnesium oxide (0.69 Kg), and oleic acid (4 gr) were gradually added to 3.83 liter of water at ambient temperature, and efficiently admixed. After the mechanical mixing was terminated, the white suspension was dried by means of a spray drier. The immersion test results were obtained by experienced an aided eye after 500 hours, evaluating the general appearance, scribe, blisters size and degree of each triplet. The average test results of those panels were good (according to ASTM standard). The results were better than the results obtained for other panels coated with similar paints comprising commercial available anti-corrosive pigments.

EXAMPLE 3

A dose of 1.81 Kg of 2,4,6-triamino-s-triazine (C.P. Grade) was mixed with 30.7 liter water at 16° C. in a 60 liter planetary reactor for about 5 minutes. Phosphoric acid (3.05 Kg, Agriculture Grade, 98%) was added and mixed for additional 5 minutes. Magnesium Oxide (4.37 Kg, KP Grade by Periclase ltd Israel), oleic acid (2.4 gr) were similarly added to the water suspension by few intervals and efficiently admixed. After the mechanical mixing was terminated, the yielded white suspension was dried by means of a paddle drier. The solubility of the obtained product in water was in the range of 0.30–0.35% (wt). The immersion test results were obtained by experienced an aided eye after 500 hours, evaluating the general appearance, scribe, blisters size and degree of each triplet. The average test results of those panels were good (according to ASTM standard). The results were better than the results obtained for other panels coated with similar pants comprising commercial available anti-corrosive pigments.

EXAMPLE 4

A dose of 1.84 Kg of 2,4,6-triamino-s-triazine (C.P. Grade) was mixed with 17.6 liter water at room temperature in a 60 liter planetary reactor for about 5 minutes. Phosphoric acid (3.05 Kg, 85%) was added and mixed for additional 7 minutes. Magnesium oxide (1.21 Kg), oleic acid (3 gr) and calcium carbonate (6.08 Kg C.P. Grade) were similarly added to the water suspension by few intervals and efficiently admixed. After the mechanical admixing was terminated, the white suspension was dried by means of a screw drier. The solubility of the obtained product in water was in the range of 0.30–0.40% (wt). The immersion test results were obtained by experienced an aided eye after 500 hours, evaluating the general appearance, scribe, blisters size and degree of each triplet. The average test results of those panels were good (according to ASTM standard). The results were better than the results obtained for other panels coated with similar paints comprising commercial available anti-corrosive pigments.

EXAMPLE 5

Phosphoric acid (3.92 Kg) was added to 9.43 liter of water at 17.5° C. and mixed for 2 minutes. Ferrous silicate (15.1 Kg, C.P. Grade), oleic acid (3.8 gr) and magnesium oxide (1.5 Kg) were similarly added to the water suspension by few intervals and efficiently admixed. After the mechanical mixing was terminated, the obtained white suspension was dried by means of an oven (2.5 hours, above 125° C.). The solubility of the obtained product in water was in the range of 0.35–0.45% (wt). The immersion test results were obtained by experienced an aided eye after 500 hours, evaluating the general appearance, scribe, blisters size and degree of each triplet The average test results of those panels were good (according to ASTM standard). The results were better than the results obtained for other panels coated with similar paints comprising commercial available anti-corrosive pigments.

EXAMPLE 6

A dose of 1.81 Kg of 2,4,6-triamio-s-triazine (C.P. Grade) was mixed with 25.64 liter water at ambient temperature in a 60 liter planetary reactor for about 5 minutes, Phosphoric acid (3.05 Kg) was added and mixed for additional 12 minutes. Magnesium hydroxide (9.43 Kg, by Periclase ltd Lsrael), oleic acid (2.4 gr) were similarly added to the water suspension by few intervals and efficiently admixed. After the mechanical mixing was terminated, the produced white suspension was dried in an oven (2.5 hours, above 145° C.). The immersion test results were obtained by experienced an aided eye after 500 hours, evaluating the general appearance, scribe, blisters size and degree of each triplet. The average test results of those panels were excellent (according to ASTM standard). The results were better than the results obtained for other panels coated with similar paints comprising commercial available anticorrosive pigments.

EXAMPLE 7

A dose of dry 13.7 g of tri-magnesium diphosphate octahydrate (by Fluka, Germany) was mixed and milled with a dry powder of magnesium oxide (6.3 g). The immersion test results were obtained by experienced an aided eye after 500 hours, evaluating the general appearance, scribe, blisters size and degree of each triplet. The average test results of those panels were low (according to ASTM standard).

EXAMPLE 8

A dose of dry 13.7 g of tri-magnesium diphosphate octahydrate (by Fluka, Germany) was mixed and magnesium oxide (6.3 g) in 200 ml water. The immersion test results were obtained by experienced an aided eye after 500 hours, evaluating the general appearance, scribe, blisters size and degree of each triplet. The results were better than the results obtained in experiment 7.

EXAMPLE 9

A dose of dry 6.3 g of tri-magnesium diphosphate octahydrate (by Fluka, Germany) was mixed and milled with a dry powder of magnesium oxide (13.7 g). The immersion test results were obtained by experienced an aided eye after 500 hours, evaluating the general appearance, scribe, blisters size and degree of each triplet. The results were better than the results obtained for experiment 8.

EXAMPLE 10

Tri-magnesium diphosphate octahydrate salt (by Fluka, Germany), 10 g was equilibrated with 100 ml deionized water for approximately 30 min by means of magnetic stirrer (about 300 rpm) at ambient temperature.

The molar ratio of the total magnesium cations to the total phosphate anions in an equilibrated aqueous phase is presented in FIG. 1. The X axis of said figure relates to the number of said equilibrating step, wherein 10 g of the tested tri-magnesium diphosphate octahydrate salt is equilibrated for approximately 30 min. by means of magnetic stirrer with 100 ml water at ambient temperature of about 23° C. The immersion test results were obtained by experienced an aided eye after 500 hours, evaluating the general appearance, scribe, blisters size and degree of each triplet. The average test results of those panels were low to moderate (according to ASTM standard).

EXAMPLE 11

Agricultural grade phosphoric acid (98%) was diluted in water so about 10% (wt) solution of said phosphoric acid was provided. The solution was mechanically mixed with access of magnesium oxide (Magnesia KP, by Periclas, Israel) in six intervals, so a dispersion comprising interalia magnesium phosphate salts, and magnesium oxide was provided. The pH of the obtained dispersion was 9.8. The magnesium cation to the phosphate molar ratio as function of the number of the washing steps is described in FIG. 2. The product was incorporated in paint and tested in an immersion test as defined above. The average test results of those panels were excellent (according to ASTM standard). The results were better than the results obtained for other panels coated with similar paints comprising commercial available anti-corrosive pigments.

EXAMPLE 12

Agricultural grade phosphoric acid (98%) was diluted in water so about 10% (wt) solution of said phosphoric acid was provided The solution was mechanically mixed with melamine so about 10% (wt) melamine phosphate solution was provided. Then, about 30% (wt) magnesium oxide was admixed in six intervals, so a dispersion analyzed (i.e., by means of XRD and HRSEM and EDS) to comprise interalia magnesium phosphate salts, melamine phosphate, melamine magnesium phosphate and magnesium oxide was provided. The pH of the obtained dispersion was 9.8. The magnesium cation to the phosphate molar ratio as function of the number of the washing steps is described in FIG. 3. The product was incorporated in paint and tested in an immersion test as defined above. The average test results in aluminum panels and other metal ware panels were excellent (according to ASTM standard). The results were better than the results obtained for other panels coated with similar paints comprising commercial available anti-corrosive pigments.

What is claimed is:

1. An anti-corrosive pigment-containing composition, comprising a mixture of a metal phosphate and a metal compound having at least one oxygen atom, said metal compound selected from the group consisting of metal oxide and metal hydroxide, wherein the metal ion in said metal phosphate and said metal compound is the same and is selected from the group consisting of magnesium (Mg), calcium (Ca) divalent iron (Fe(II)) or any combination thereof; wherein said mixture is the pigment, and wherein the molar ratio of the total metal ion to phosphate anion is in the range of 4:1 to 120:1; wherein said phosphate is an inorganic phosphate; and the solubility of said pigment in equilibrated water is greater than about 0.2%.

2. The pigment-containing composition of claim 1, wherein said metal ion in said metal phosphate and metal compound is magnesium.

3. The pigment-containing composition of claim 1, wherein said metal compound having at least one oxygen atom is magnesium having at least one oxygen atom selected from magnesium oxide, magnesium hydroxide or any combination thereof.

4. The pigment-containing composition of claim 1, wherein said metal ion in said metal phosphate and metal compound is iron.

5. The pigment-containing composition of claim 1, wherein said metal compound having at least one oxygen atom comprising iron and selected from ferrous oxide, iron hydroxide, or any combination thereof.

6. The pigment-containing composition of claim 1, wherein said metal ion in said metal phosphate and metal compound is calcium.

7. The pigment-containing composition of claim 1, wherein said metal compound having at least one oxygen atom comprising calcium and selected from calcium oxide, calcium hydroxide, or any combination thereof.

8. The pigment-containing composition of claim 1, further comprising a pH buffering agent.

9. The pigment-containing composition of claim 8, wherein said pH buffering agent is an amine-containing substance.

10. The pigment-containing composition of claim 9, wherein said pH buffering agent is an amine-containing substance selected from monoethyl amine, diethyl amine, triethyl amine, monoethanol amine, diethanol amine, triethanol amine, 1,2-diazide, 1,2,3-triazide, dicyclohexylamine, aliphatic amines, aromatic amines, melamine, hexamethylentetramine and pentaethylenetetramine, ammonium hydroxide, amino acid, and poly amines.

11. The pigment-containing composition of claim 8 wherein said pH buffering agent is a base.

12. The pigment-containing composition of claim 11 wherein said base is selected from potassium hydroxide, sodium hydroxide, and calcium hydroxide.

13. The pigment-containing composition of claim 1, wherein the final pH of said pigment is about 7 to 11.

14. The pigment-containing composition of claim 1, wherein the solubility of said pigment in equilibrated water is in the range of greater than about 0.2% to 0.8%.

15. The pigment-containing composition of claim 1, wherein said metal compound having at least one oxygen atom comprises magnesium compound in combination with a calcium compound.

16. The pigment-containing composition of claim 15, wherein said magnesium compound selected from magnesium oxide, magnesium hydroxide or any combination thereof, and wherein said calcium compound selected from calcium oxide, calcium hydroxide or any combination thereof.

17. The pigment-containing composition of claim 1, wherein said metal compound having at least one oxygen atom comprises magnesium compound in combination with an iron compound.

18. The pigment-containing composition of claim 17, wherein said magnesium compound is magnesium oxide, magnesium hydroxide or any combination thereof, and wherein said iron compound is ferrous oxide, iron hydroxide, or any combination thereof.

19. The pigment-containing composition of claim 1, wherein said molar ratio of said total metal ion to said phosphate anion is about 18:1.

20. The pigment-containing composition of claim 1, wherein said molar ratio of said total metal ion to said phosphate anion is about 20:1 to 50:1.

21. The pigment-containing composition of claim 1, wherein said molar ratio of said total metal ion to said phosphate anion is about 50:1 to 80:1.

22. The pigment-containing composition of claim 1, wherein said molar ratio of said total metal ion to said phosphate anion is about 80:1 to 100:1.

23. The pigment-containing composition of claim 1, further comprising a preservative in a range of 0.1 to 10% (w/w) of the pigment weight.

24. The pigment-containing composition of claim 23 wherein said preservative is selected from biocides, fungicides, algaecides, sporocides, insecticides, or herbicides.

25. The pigment-containing composition of claim 23 wherein said preservative is selected from citrimide, chlorohexadine, and quaternary amines.

26. The pigment-containing composition of claim 23 wherein said preservative is an inorganic preservative selected from boric acid, sodium borate, zinc oxide or copper oxide.

27. The pigment-containing composition of claim 1 further comprising a surface-active agent in the range of 0.2 to 2% (w/w) of the pigment weight.

28. The pigment-containing composition of claim 27 wherein said surface active agent is lignosulphonates or oleic acids.

29. The pigment-containing composition of claim 1 further comprising a coloring agent in a range of approximately 0.1–40% (w/w) of the pigment weight.

30. The pigment-containing composition of claim 29 wherein said coloring agent is selected from fuchsin, rohdamine, methylene blue, iron oxide, methyl violet, or alizarine.

31. The pigment-containing composition of claim 1 further comprising a UV stabilizer.

32. The pigment-containing composition of claim 1 further comprising a UV absorber.

33. The pigment-containing composition of claim 1 further comprising a UV enhancer.

34. A waterborne material selected from paint, coating, plaster or filler comprising the anti-corrosive pigment-containing composition of claim 1, wherein said pigment is at a concentration range of 1.7 to 25% (w/w).

35. A solvent base material selected from paint, coating, plaster or filler comprising the anti-corrosive pigment-containing composition of claim 1, wherein said pigment is at a concentration range of 1.7 to 25% (w/w).

36. An emulsion material comprising the anti-corrosive pigment of claim 1, wherein said pigment-containing composition is at a concentration range of 1.7 to 25% (w/w).

37. A method for producing an anti-corrosive pigment-containing composition comprising, producing the pigment by mixing phosphoric acid with a metal compound having at least one oxygen atom, wherein said metal ion in said metal compound is selected from the group consisting of magnesium (Mg), calcium (Ca) divalent iron (Fe(II)) or any combination thereof, to produce a mixture of said metal compound having at least one oxygen atom and a metal phosphate, wherein the metal ion in said metal phosphate and metal compound is the same, with a molar ratio of total metal ion to phosphate anion in the range of 4:1 to 120:1.

38. The method of claim 37, wherein said metal compound having at least one oxygen atom is magnesium oxide or magnesium hydroxide.

39. The method of claim 37, wherein said phosphoric acid is diluted by water to obtain a 5–15% (wt) solution.

40. The method of claim 38 wherein said metal compound having at least one oxygen atom is gradually added to a range of 7–35% (wt) of the pigment.

41. The method of claim 38 wherein additional magnesium phosphate salt is gradually admix to said phosphoric acid and metal compound having at least one oxygen atom to yield a molar ratio of the total magnesium to the phosphate in the range of 4:1 to 120:1.

42. The method of claim 37, wherein said mixing phosphoric acid with said metal compound having at least one oxygen atom comprises mixing 5 to 15% (wt) phosphoric acid with 7 to 35% (wt) magnesium oxide or magnesium hydroxide so as to obtain a pH of about 7 to 11 in said anti-corrosive pigment.

43. The method of claim 37, wherein said mixing phosphoric acid with said metal compound having at least one oxygen atom comprises mixing 7 to 35% (wt) magnesium oxide or magnesium hydroxide to 5–15% (wt) phosphoric acid solution so as to achieve solubility of the pigment magnesium-containing ingredients which is higher than 0.2%.

44. The method of claim 37, wherein said mixing phosphoric acid with said metal compound having at least one oxygen atom comprises mixing 7 to 35% (wt) magnesium oxide or magnesium hydroxide to 5–15% (wt) phosphoric acid solution so as to achieve solubility of the pigment magnesium-containing ingredients which is approximately in the range 0.2%–0.8%.

45. The method of claim 37, wherein said mixing phosphoric acid with said metal compound having at least one oxygen atom wherein said metal compound having at least one oxygen atom comprising magnesium oxide, magnesium hydroxide, calcium oxide and calcium hydroxide substances.

46. The method of claim 37, wherein said mixing phosphoric acid with said metal compound having at least one oxygen atom wherein said metal compound having at least one oxygen atom comprising magnesium oxide, magnesium hydroxide, iron oxide and iron (II) hydroxide substances.

47. The method of claim 37, wherein said mixing phosphoric acid with said metal compound having at least one oxygen atom comprises mixing 5–15% (wt) phosphoric acid solution, 3–10% (wt) of at least one amine containing substance and 7 to 35% (wt) magnesium oxide or magnesium hydroxide in water.

48. The method of claim 37, wherein said mixing phosphoric acid with said metal compound having at least one oxygen atom further comprises the steps of:
admixing 3–10% (wt) of at least one amine containing substance in water; with said phosphoric acid to obtain a 5–15% (wt) amino phosphoric acid solution, admixing 7 to 35% (wt) of said magnesium oxide or magnesium hydroxide to said amino phosphoric acid to obtain magnesium phosphate, magnesium oxide, and magnesium amino phosphate.

49. The method of claim 37, wherein said mixing phosphoric acid with said metal compound having at least one oxygen atom further comprises the steps of: gradually admixing 5–15% (wt) phosphoric acid solution, 3–10% (wt) of a base and 7 to 35% (wt) magnesium oxide or magnesium hydroxide in water.

50. The method of claim 37, wherein said mixing phosphoric acid with said metal compound having at least one oxygen atom further comprises the step of gradually admixing 5–15% (wt) phosphoric acid solution, 3–10% (wt) of a combination of at least one amine containing substance and a base and 7 to 35% (wt) magnesium oxide or magnesium hydroxide in water.

* * * * *